United States Patent
Quast et al.

(10) Patent No.: US 9,244,884 B2
(45) Date of Patent: Jan. 26, 2016

(54) METHOD OF CONTROLLING AN OPTICAL OUTPUT DEVICE FOR DISPLAYING A VEHICLE SURROUND VIEW AND VEHICLE SURROUND VIEW SYSTEM

(71) Applicants: Johannes Quast, Karlsruhe (DE); Kay-Ulrich Scholl, Karlsbad (DE)

(72) Inventors: Johannes Quast, Karlsruhe (DE); Kay-Ulrich Scholl, Karlsbad (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 39 days.

(21) Appl. No.: 13/651,964

(22) Filed: Oct. 15, 2012

(65) Prior Publication Data
US 2014/0107888 A1    Apr. 17, 2014

(30) Foreign Application Priority Data
Oct. 13, 2011   (EP) .................................. 11185124.2

(51) Int. Cl.
G06F 17/00 (2006.01)
B60R 1/00 (2006.01)

(52) U.S. Cl.
CPC . *G06F 17/00* (2013.01); *B60R 1/00* (2013.01); *B60R 2300/60* (2013.01)

(58) Field of Classification Search
USPC .......................................................... 701/36
See application file for complete search history.

(56) References Cited

U.S. PATENT DOCUMENTS

| | | | | |
|---|---|---|---|---|
| 6,111,582 | A * | 8/2000 | Jenkins | 345/421 |
| 6,178,358 | B1 * | 1/2001 | Colarelli | G01B 21/26 700/16 |
| 6,366,221 | B1 * | 4/2002 | Iisaka et al. | 340/932.2 |
| 6,483,429 | B1 | 11/2002 | Yasui et al. | |
| 6,539,288 | B2 * | 3/2003 | Ishida et al. | 701/1 |
| 6,885,939 | B2 * | 4/2005 | Schmidt et al. | 701/428 |
| 6,922,632 | B2 * | 7/2005 | Foxlin | 701/517 |
| 7,058,207 | B2 * | 6/2006 | Iida et al. | 382/104 |
| 7,375,728 | B2 * | 5/2008 | Donath et al. | 345/427 |
| 7,725,253 | B2 * | 5/2010 | Foxlin | 701/519 |
| 7,925,441 | B2 * | 4/2011 | Maemura et al. | 701/301 |
| 8,441,441 | B2 * | 5/2013 | Tsai et al. | 345/157 |
| 2001/0026217 | A1 * | 10/2001 | Sumada | B60K 37/02 340/438 |
| 2002/0110262 | A1 | 8/2002 | Iida et al. | |
| 2004/0068350 | A1 * | 4/2004 | Tomson | G01C 21/36 701/1 |
| 2004/0085335 | A1 * | 5/2004 | Burlnyk | G06F 3/04815 715/716 |
| 2004/0169663 | A1 * | 9/2004 | Bernier | 345/629 |

(Continued)

FOREIGN PATENT DOCUMENTS

WO     2011085489     7/2011

*Primary Examiner* — Calvin Cheung
*Assistant Examiner* — Krishnan Ramesh
(74) *Attorney, Agent, or Firm* — O'Shea Getz P.C.

(57) ABSTRACT

The present invention relates to controlling an optical output device for displaying a vehicle surround view containing a vehicle model, the method comprising determining display control information for at least one vehicle component, and controlling the optical output device to display the vehicle surround view such that the vehicle model is adapted to depict the at least one vehicle component according to the display control information.

8 Claims, 3 Drawing Sheets

(56) References Cited

U.S. PATENT DOCUMENTS

| | | | |
|---|---|---|---|
| 2006/0155429 A1* | 7/2006 | Boone | B60K 35/00 701/1 |
| 2006/0187305 A1* | 8/2006 | Trivedi et al. | 348/169 |
| 2007/0299584 A1* | 12/2007 | Okamoto | B60R 1/00 701/41 |
| 2008/0106593 A1* | 5/2008 | Arfvidsson et al. | 348/39 |
| 2008/0278298 A1* | 11/2008 | Waeller | B60K 35/00 340/425.5 |
| 2009/0002142 A1* | 1/2009 | Morimoto | A61M 21/00 340/425.5 |
| 2009/0112389 A1* | 4/2009 | Yamamoto | B60C 23/0401 701/31.4 |
| 2009/0295922 A1 | 12/2009 | Mori | |
| 2010/0033342 A1* | 2/2010 | Patenaude | B60R 25/2018 340/8.1 |
| 2010/0057281 A1* | 3/2010 | Lawyer | G07C 5/0825 701/22 |
| 2010/0085370 A1* | 4/2010 | Usui | B60K 35/00 345/564 |
| 2010/0253597 A1* | 10/2010 | Seder et al. | 345/7 |
| 2011/0074561 A1* | 3/2011 | Mackjust | B60R 25/10 340/426.13 |
| 2011/0175752 A1* | 7/2011 | Augst | B60R 1/00 340/905 |
| 2011/0282537 A1* | 11/2011 | Yamasaki | G06F 3/017 701/31.4 |
| 2012/0062743 A1* | 3/2012 | Lynam et al. | 348/148 |
| 2012/0287282 A1* | 11/2012 | Kinoshita | B60R 1/00 348/148 |

* cited by examiner

METHOD OF CONTROLLING AN OPTICAL OUTPUT DEVICE FOR DISPLAYING A VEHICLE SURROUND VIEW AND VEHICLE SURROUND VIEW SYSTEM

1. CLAIM OF PRIORITY

This patent application claims priority from EP Application No. 11 185 124.2 filed Oct. 13, 2011, which is hereby incorporated by reference.

2. FIELD OF TECHNOLOGY

The invention relates to displaying a vehicle surround view and a vehicle surround view system.

3. RELATED ART

In recent years the use of image sensors in vehicles is proliferating. Often, these image sensors/cameras are used in a driver assist system in which the image sensors track the vehicle environment, identify objects, and warn the driver of possible dangerous driving situations. Furthermore, image sensors are used as rear view cameras which help the driver with parking the vehicle and which help the driver to be informed of any obstacle located behind the vehicle. The different image sensors provide a three-dimensional scene of the vehicle and its surroundings.

However, it has been observed that a combination of the dynamic displaying of the vehicle surrounding with a static vehicle model causes disturbance to the user. The perception of a static and predefined vehicle model with no indications of movement in combination with a moving background is known to cause distraction.

There is a need for a more realistic driver perspective view of the vehicle model within a vehicle surround view.

SUMMARY OF THE INVENTION

A method of controlling an optical output device for displaying a vehicle surround view containing a vehicle model comprises determining display control information for at least one vehicle component, and controlling the optical output device to display the vehicle surround view such that the vehicle model is adapted to depict the at least one vehicle component according to the display control information.

The display control information may relate to a current operational state of the respective vehicle component. Such display control information may contain information on vehicle components, such as wheels, lights or other interior and exterior vehicle components such as the vehicle body or the doors. Information on the vehicle components as contained in the display control information may be used to adapt the vehicle model displayed in a vehicle surround view. By this, a more realistic graphical representation of the vehicle, i.e., the vehicle model, may be obtained.

This has the effect that the respective vehicle components are depicted in the vehicle surround view in a defined manner based on the display control information. In particular, the vehicle components can be depicted in a way that makes it easier for the user to perceive and understand the vehicle surround view. If the user can intuitively understand the information displayed by the vehicle surround view, it is less likely for the user to be distracted. Dangerous situations due to distraction are less likely.

For illustration, the display control information may specify in detail how a certain vehicle component behaves or which properties the vehicle component possesses. The display control information may contain information such as colors, velocities, presence or absence of a vehicle component, the operational states of the vehicle components, etc. By providing such information, the vehicle model in the vehicle surround view may be adapted accordingly.

For further illustration, the display control information of a vehicle window may relate to "fully open window" in order to provide a graphical representation of a fully open window. Other possible display control information may relate to "half open window" or "closed window". It is also possible to specify more precise display control information, relating to such information as "window pane 65% retracted".

For further illustration, it is possible to receive status information on at least one vehicle component indicating a current operational state of the at least one vehicle component, wherein the display control information is determined based on at least the received status information.

The status information may contain the current operational state of a certain vehicle component, for example the opening state of a door, the turning angle of the steering wheel, or the velocity of the vehicle itself. Many other forms of status information from other vehicle components are possible. The status information may be updated in accordance with a change in the current operational state of the respective vehicle component. Based on such up-to-date status information of a certain vehicle component, it is possible to determine respective display control information. In this context, the respective display control information may relate to the vehicle component for which the status information is provided itself, or even to other vehicle components as is explained in detail below.

For example, display control information for a vehicle door may contain received status information on the opening state of the door. For example, if the door is wide open, the display control information may indicate "door fully open". However, display control information regarding the wheels of a vehicle may be obtained from status information received from a plurality of other vehicle components. For illustration from the turning angle of the steering wheel, the vehicle velocity, and the diameter of the wheels, display control information of the vehicle wheels regarding the turning angle and the rotational speed may be obtained. Therefore, the display control information of the wheels may be determined from status information obtained from other components of the vehicle.

A further implementation would be to obtain display control information on whether vehicle lights are switched on or off. Typically, in a modern vehicle such information is already present on a data bus system contained in the vehicle. Certain vehicle components transmit the current operational state from time to time via such a data bus system. It is possible to obtain the status information from the vehicle components via already existing setups within the car.

It is also possible to provide dedicated sensors in order to obtain the status information on the operational state of the vehicle. For example, sensors may be provided within the seats of a vehicle which indicate whether a vehicle occupant is present in a certain seat. In case a certain sensor indicates, for example by measuring a weight, that a certain seat is occupied by an occupant, the display control information relating to the presence or absence of vehicle components may be determined which represent the form of vehicle occupants. In case a vehicle occupant is present in the vehicle, the vehicle model of the vehicle surround view may be adapted to depict a graphical representation of a vehicle occupant.

In particular, the status information may comprise at least one of the following: wheel rotational speed, steering wheel angle, vehicle velocity, operational state of lights, windowpane position, sunroof position. For example, the wheel rotation speed may be obtained from a sensor located within the vehicle wheels. If such an information is obtained, it can be used to determine the display control information by specifying a certain rate of rotation which is then used to control the optical output device in order to visualize this rate of rotation of the vehicle in the vehicle model. It is also possible to obtain this information from, for example, the vehicle velocity and a predefined information on the wheel diameter. It is also possible to determine the turning angle of wheels from, for example the steering wheel angle and possibly the vehicle velocity. For illustration, the steering wheel angle may be used to determine a wheel turning angle taking into account the vehicle velocity. Then it is necessary to receive two status information in order to determine the wheel turning angle. The operational state of the lights, the window pane position, and the sun roof position can also be used to adapt the vehicle model graphically in the vehicle surround view.

Furthermore, it is possible to re-iterate the determining of the display control information over time, when a change in status information is detected. For illustration, when it is detected that a certain vehicle component has a changed operational state, for example the vehicle lights have been switched on by a user or the turn indicators are used, the display control information can be updated accordingly. This results in an update of the graphical representation of the respective vehicle component in the vehicle surround view. In particular, this has the advantage that when the user performs a certain action, he finds that this action also has some impact on the graphical representation of the vehicle in the vehicle surround view. On the one hand, by this the potential for a dangerous distraction is reduced, because the user can intuitively understand and perceive the depicted vehicle model. On the other hand, a higher degree of feedback is provided to the user because a certain action also finds its graphical counterpart in the depiction of the vehicle model in the vehicle surround view. Unintended actions of the user may therefore be avoided or reduced. For example, the unintended use of long distance lights may be easily recognized via the vehicle surround view. Another advantage is the feedback of actions given to the user. A user may switch off the vehicle front lights. When the graphical representation of the front and rear lights of the vehicle are updated so as to represent the operational state of the rear and front lights, a moment of distraction may be avoided which results from the user not perceiving a graphical feedback of his action in the vehicle surround view.

However, the display control information may also be determined based on at least user configuration data obtained from a user input. For example, it is possible to provide a human interface device which allows a user to adapt certain display control information according to his needs. For example, the user may be distracted by a certain appearance of the vehicle model in the vehicle surround view. In order to avoid such a distraction, it can be advantageous to provide the user with the possibility to determine the display control information according to his needs. For example, the respective display control information may be adapted such that a vehicle model has a certain vehicle body lacquering, this means the exterior color of the vehicle model may be adapted according to the needs of a user.

The user configuration data may be stored in a database. By storing the user configuration data in a database, it is possible to maintain a certain appearance of the vehicle model over a period of time. For example, it can be advantageous to set the color of the body of the vehicle model when the car is manufactured via user configuration data. By this, the manufacturer has the possibility to adapt the vehicle model according to the real vehicle parameters. The display control information for certain vehicle components, such as for those components for which no status information may be received due to the lack of respective sensors, may be predefined. This makes it possible to further adapt the appearance of the vehicle model even though, for example, no status information is received on certain vehicle components such as colors, presence or absence of certain features of the vehicle body, such as a sun roof or rear doors, or optional features purchased by a user. For example, there exists typically no sensor which indicates the presence or absence of a liftback. If the respective display control information is predefined, this has the effect that the appearance of the vehicle model in the vehicle surround view will be adapted accordingly.

Another aspect may further comprise establishing a virtual camera position of the vehicle surround view and calculating a graphical representation of the at least one vehicle component based on the virtual camera position and the display control information. For example, when the display control information specifies a certain opening angle of a window of the vehicle, e.g., relates to "window pane half retracted", a graphical representation of the window in the vehicle model of the vehicle surround view may be calculated by a graphical processor. Because the graphical representation of, for example, a half open window may depend on the camera position used for depicting the vehicle surround view, it may be necessary to interpret the display control information accordingly in order to calculate the graphical representation of the vehicle model which represents this information correctly.

In particular, there may be large numbers of possible combinations of virtual camera positions and possible display control information for the different vehicle components. It may be advantageous to calculate the graphical representation of the vehicle component based on the display control information and the virtual camera position each time, rather than provision a set of predefined graphical representations, for example, in the form of a image data, for each combination of camera position and display control information. Storage space requirements may be reduced when it is not required to store graphical representations for each combination of camera position and display control information. The display control information may be interpreted and the graphical output may be calculated and provided to overcome such deficiencies.

Moreover, displaying the vehicle surround view may comprise dynamic animation of the at least one vehicle component. For example, it may be possible to animate the turning of the wheels, the flashing of the turn indicators, or the opening and closing of the window pane. When such a dynamic animation of the vehicle model is provided, the user may more intuitively perceive the vehicle surround view. A more realistic vehicle surround view is provided. This is because the dynamically animated vehicle model fits into the dynamic surrounding provided by the vehicle surround view itself. A contrast between the moving background and the static vehicle model is avoided and therefore the potential for dangerous distraction of the user is reduced further.

In particular, it is possible that the at least one vehicle component is selected from a group comprising: wheel, steering wheel, window pane, front lights, rear lights, sun roof, vehicle body lacquering, turn indicator, or vehicle occupants. The adaptation of the vehicle model for those vehicle components has the effect that the vehicle model relates to the vehicle model as perceived by the user in real life. For example, the turning angle of the wheels may be adapted according to the current driving situation of the vehicle. When the vehicle is moving, the background in the vehicle surround view will be moving with respect to the vehicle model. When the wheels are rotating according to the velocity of the vehicle, the vehicle model and the background obtained from image sensors provide an intuitively perceivable impression on the user.

According to a further aspect, a vehicle surround view system comprising a processor for controlling an optical output device for displaying a vehicle surround view containing a vehicle model is provided. The processor is configured to determine display control information for at least one vehicle component, and to control the optical output device to display the vehicle surround view such that the vehicle model is adapted to depict the at least one vehicle component according to the display control information.

For a system having such a configuration, effects corresponding to the effects explained for the corresponding method may be attained.

According to a further aspect, a computer program is provided which comprises computer-executable instructions which, when executed by a processor of a vehicle surround view system, direct the vehicle surround view system to perform the method of an aspect or embodiment.

The processor may be configured to perform the method of any one aspect or embodiment.

These and other objects, features and advantages of the present invention will become apparent in light of the detailed description of the embodiments thereof, as illustrated in the accompanying drawings. In the figures, like reference numerals designate corresponding parts.

DESCRIPTION OF THE DRAWINGS

Embodiments of the invention will be described in further detail below with reference to the accompanying drawings. In these drawings

DETAILED DESCRIPTION OF THE INVENTION

Figure 1:
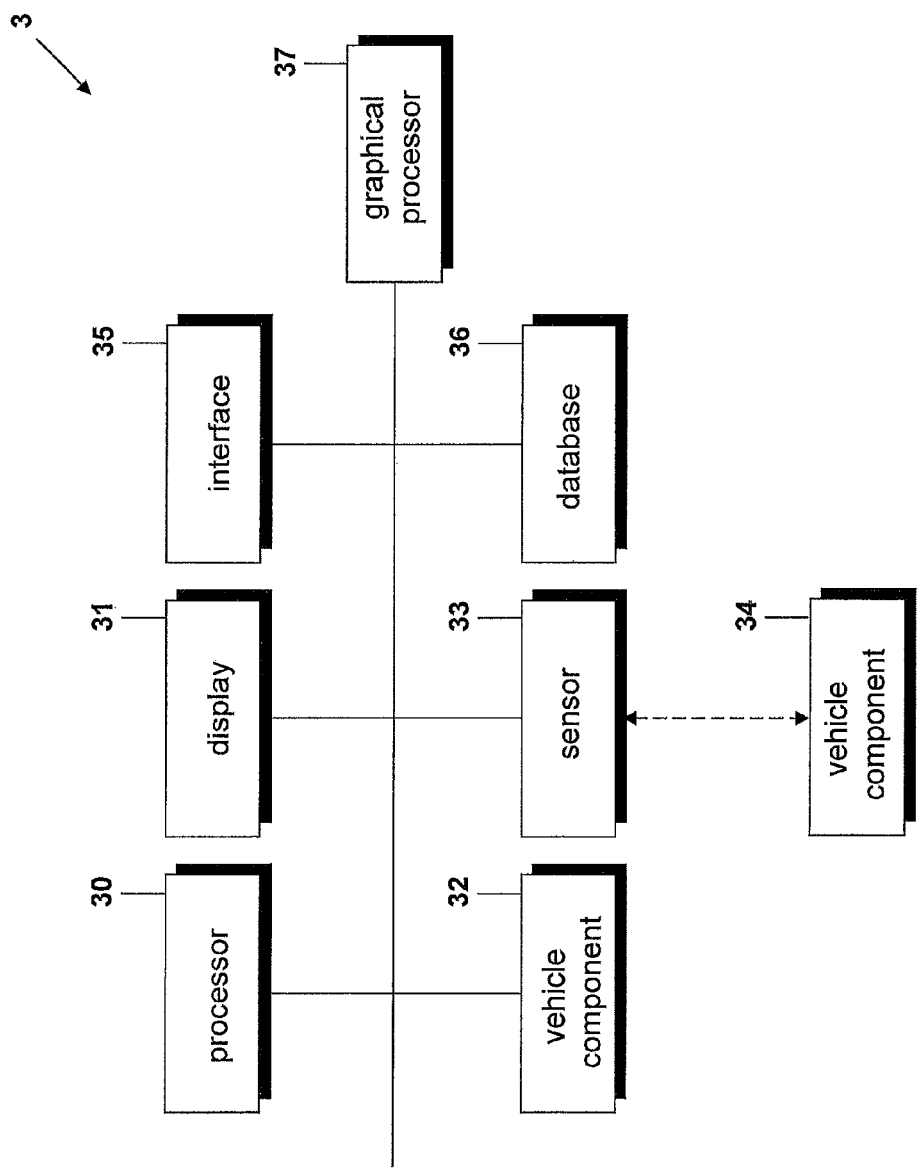
FIG. 1 is a block diagram illustration of a vehicle surround view system.

FIG. 1 is a block diagram illustration of a vehicle surround view system 3. The system 3 comprises a processor 30 that is configured to determine display control information for different vehicle components 32, 34. In particular, it is further configured to control an optical output device 31 in order to adapt a vehicle model contained in a vehicle surround view to depict the vehicle components 32, 34 based on the respective display control information.

For example, the optical output device 31 may be a display of a vehicle navigation system or a vehicle computer. Typically, modern navigation systems provide a display which can be used in certain situations to display the vehicle surround view rather than the information on navigation. Also, it is possible that the optical output device is a display only used by the vehicle surround view system itself.

The display control information is at least partly determined based on status information received from either the vehicle component 32 itself or a sensor 33 which detects an operational state of the vehicle component 34. A situation where the vehicle component 32 transmits status information may be the illumination status of vehicle lights. Typically, information on the status of vehicle lights, such as "lights on", "lights off", or "long distance lights on", are present on a vehicle data bus. Such information may then be used in order to determine the respective display control information. Furthermore, the sensor 33 may be provided in order to determine a current status of the vehicle component 34. For example, the sensor may be detecting whether at a certain seat a vehicle occupant is present. The sensor 33 detects the opening or closed state of the trunk lid or vehicle door. If it is detected that a vehicle door is open, the respective display control information is adapted such that in the vehicle surround view the vehicle door is displayed in the same opening state. It should be understood that it is possible to use status information received from a plurality of vehicle components to determine the display control information for another vehicle component.

Furthermore, the vehicle surround view system 3 comprises a human interface device 35. The human interface device 35 is adapted to allow the user to set display control information via user configuration data. For example, the user may specify the color or the absence or presence of certain vehicle components. Furthermore, the user may specify a certain appearance of a vehicle occupant. The user may provide certain image data such that a vehicle occupant is depicted as a graphical representation familiar to the user. Furthermore, the manufacturer of the vehicle can set user configuration data for different vehicle components according to his needs. For example, the manufacturer may specify the user configuration data such that certain features particular to the vehicle are depicted in the vehicle model of the vehicle surround view accordingly. Such certain features may be the color of the car, particular shapes of the vehicle body, such as a hatchback or a liftback, presence or absence of a sun roof, or the presence or absence of rear vehicle doors. For such vehicle components it may be difficult to determine display control information based on status information because no accordingly adapted sensor may be present. Then, such user configuration data is stored in a database 36. The database 36 may be used to determine display configuration data based on user configuration data, even if no status information is received for the particular vehicle component iteratively over time.

A graphical processor 37 is adapted to interpret the display control information obtained from the processor 30 in order to provide a graphical representation of the vehicle component according to the display control information. This includes determining the viewing angle or other properties of the vehicle surround view in order to calculate the correct graphical representation of the vehicle component. Because there exists typically a large variety of possible graphical representation of a vehicle component in the vehicle model due to the combination between different possible display control information of the vehicle component and different possible viewing angles of the vehicle surround view, it is typically necessary to calculate the graphical representation for each of those combinations within the vehicle surround view system 3 itself. Another possibility is to provide a database of graphical representations relating to certain combinations of display control information and configurations of the vehicle surround views such as the viewing angle. The database contains image data, which is used as a graphical representations of the vehicle component based on the display control information.

Even though the different entities of FIG. 1 have been discussed separately, it should be understood that different entities may be combined in one unit. Different entities may be implemented as hardware or software or a combination thereof.

Figure 2:
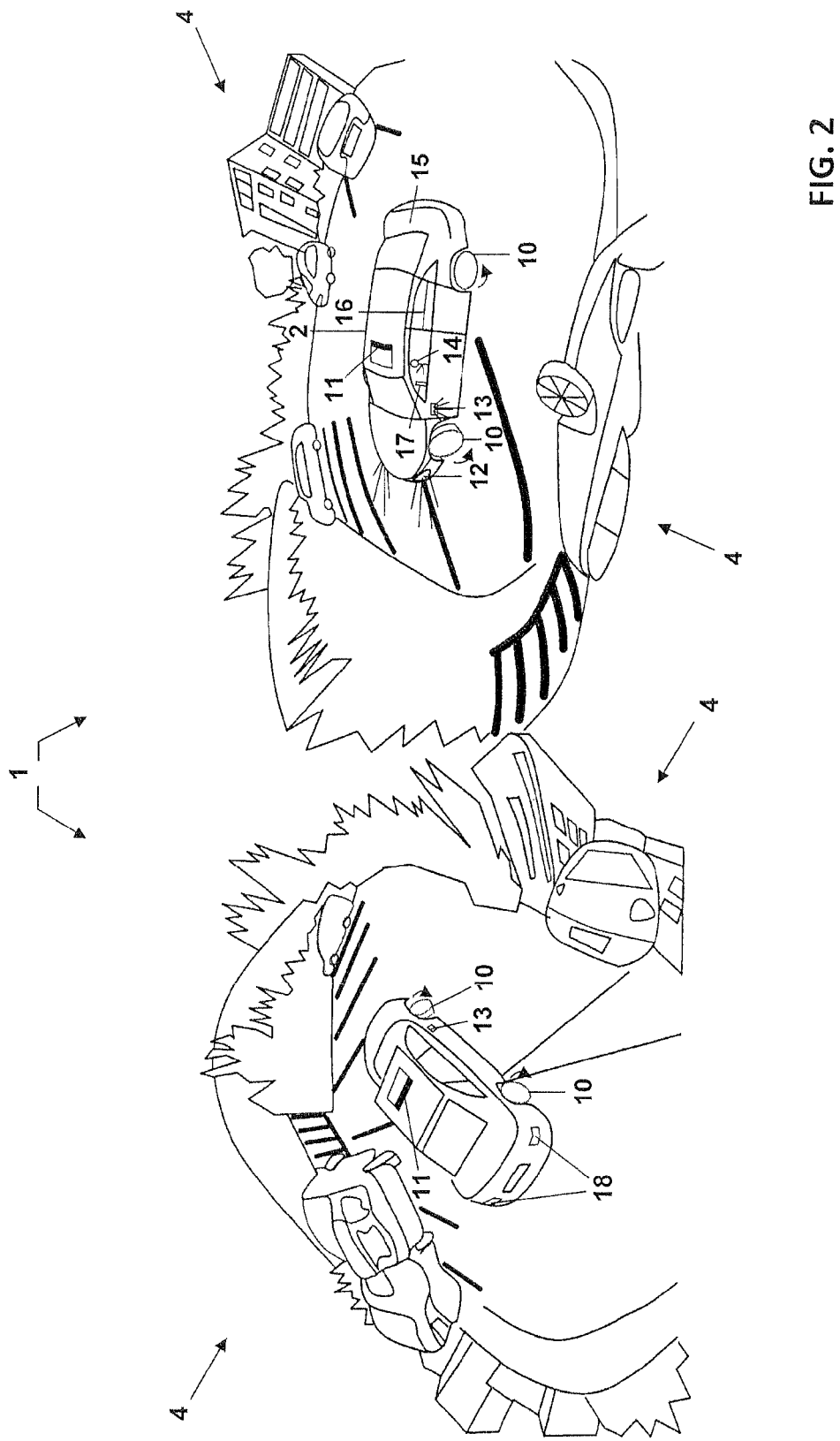
FIG. 2 is a pictorial illustration of a vehicle surround view.

FIG. 2 is a pictorial illustration of a vehicle surround view 1. In particular, a vehicle model 2 comprising various vehicle components is depicted within a background 4. The background 4 is obtained from image sensors which are positioned around the vehicle. Typically, because the vehicle is moving, the background 4 is moving with respect to the vehicle. Therefore, the background 4 constitutes a dynamic surrounding of the vehicle model 2. The vehicle model 2 is adapted to dynamically display the properties of the various vehicle components. For example, the wheels 10 are displayed in a state where they are rotating as indicated by the arrows in FIG. 2. Moreover, the displayed representation of the wheels 10 is adapted in order to depict a turning angle. In FIG. 2, the vehicle model 2 is approaching a parking space by turning left. Therefore, in FIG. 2 the pair of front wheels are adapted with a turning angle indicating the left turn. Moreover, the front lights 12 are illuminated. Front lights 12 are illuminated because the respective display control information indicates that the front lights of the vehicle are illuminated. Also, the left turn indicator 13 flashes. This is because the user of the vehicle has switched the turn indicators on, a respective status information has been received, and the respective display control information has been determined accordingly. Further vehicle components depicted in FIG. 2 are sun roof 11, vehicle occupant 14, vehicle body lacquering 15, window pane 16, steering wheel 17 and rear lights 18. For example, the sun roof 11 is depicted because in the vehicle there is a sun roof 11 present. The manufacturer or user may set the respective display control information via user configuration data, such that the sunroof is depicted. Moreover, the display control information relating to the sun roof 11 contains information on the opening state of the sun roof 11. The sun roof 11 is depicted, based on this display control information, as being half open. Respectively, the vehicle occupant 14 is determined to be present via some sensor data provided in the respective seat. The display control information indicates the presence of the vehicle occupant and therefore a graphical representation is provided within the vehicle surround view. In particular, the vehicle occupant is displayed in a user-defined manner. The user has provided image data, which allows generating user configuration data to determine the display control information such that the vehicle occupant 14 is displayed according to the image data. Respective operations and configurations apply to the way in which other vehicle components are displayed.

Figure 3:
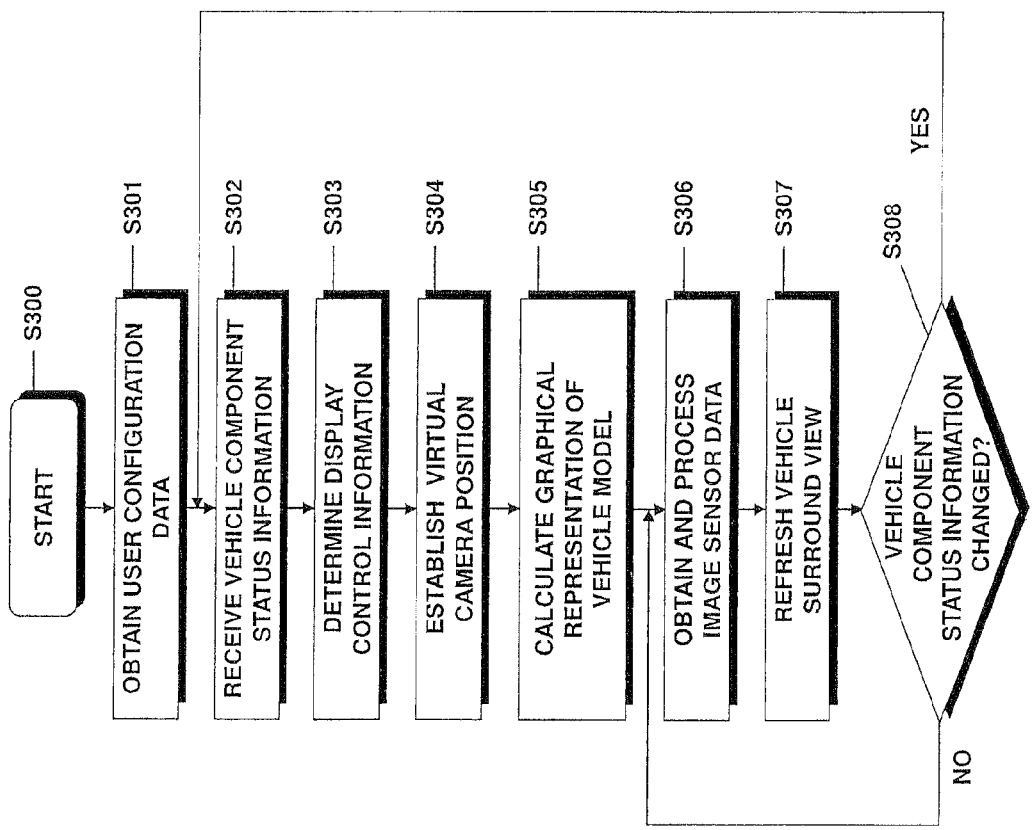
FIG. 3 shows a flowchart indicating how the vehicle surround view is adapted based on display control information relating to vehicle components.

FIG. 3 shows a flowchart indicating how the vehicle surround view is adapted based on display control information relating to vehicle components. The method starts with step 300. In step 301, user configuration data for certain vehicle components is obtained. For example, it is possible that the user configuration data is obtained via some human interface device. The user may be provided with a graphical interface allowing him to specify the user configuration data of certain vehicle components. Such vehicle components may be the lacquering of the vehicle body or the color of vehicle interior. The user may specify parameters according to his likings. Moreover, the user can personalize certain vehicle components based on the user configuration data. For example, the user can provide some image data for depicting the vehicle occupant according to such image data.

Moreover, it is possible to obtain the user configuration data in step 301 from a database. In the database, predefined user configuration data is provisioned. Such user configuration data may be preset, e.g., by the manufacturer of the vehicle. The manufacturer of the vehicle specifies certain user configuration data, such as the coloring of the vehicle body lacquering according to the vehicle body lacquering itself. Also, the user configuration data may comprise the presence or absence of certain vehicle components or features thereof. For example, if a certain vehicle comprises a sun roof, the user configuration data indicates the presence of the sun roof.

In step 302, vehicle component status information is received. The status information comprises information on the operational state of different vehicle components. Such a status information may for example indicate the velocity of the vehicle, the turning angle of the steering wheel, the on-/off-state of the vehicle lighting, the opening state of window panes, etc.

Based on such status information and based on the user configuration data, in step 303 display control information is determined. For example, from the vehicle velocity and the steering wheel angle, display control information relating to the turning angle of the wheels is determined. From the status information of the window panes, display control information relating to the window panes themselves is determined. Sensor data contained in the status information of certain vehicle components, for example the presence or absence of vehicle occupants or the opening state of the trunk lid, are also used to determine the respective display control information in step 303.

Next, in step 304, a virtual camera position of the vehicle surround view is established. For example, the virtual camera position may be specified by a user or may be predefined by the system. Once the virtual camera position and the display control information are determined and established in the step 303 and the step 304, a graphical representation of a vehicle model is calculated. In particular, the display control information is related to the graphical representation which, in turn, depends on the virtual camera position.

For example, if a window pane is slightly open, depending on the virtual camera position, the window may be displayed differently in the vehicle model. If the virtual camera position is positioned directly above the vehicle, it may be hardly visible in the vehicle surround view that the window pane is open. However, if the virtual camera position is orientated such that the virtual camera faces directly the window pane, the slightly open position of the window pane may be more visible in the graphical representation.

Once in step 305 the graphical representation of the vehicle model has been calculated, in step 306 image sensor data is obtained and processed. This means that the different images sensors providing the background of the vehicle surround view are read out in order to provide the graphical representation in the vehicle surround view. Last, in step 307 the vehicle surround view is displayed or the display is refreshed in order to display the newly calculated image data.

In step 308, it is checked whether status information of certain vehicle components has changed. This means, for example, that the status information of a vehicle component has changed by a certain amount which makes it necessary to re-determine the display control information and therefore to update the vehicle model of the vehicle surround view. A threshold comparison of the status information or of the change in status information can be conducted. If it is determined in step 308 that the status information has changed accordingly, the method proceeds with step 302, where the vehicle component status information is newly received and based on this, in step 303, the display control information is newly determined. However, if it is determined, in step 308, that the status information of a vehicle component has not changed or has changed only slightly, it is sufficient to proceed with step 306, where the image sensor data is obtained anew and processed in order to provide an updated graphical representation of the background.

The process according to FIG. 3 ends when the user does not need an updated vehicle surround view anymore.

While the invention has been described in further detail with respect to the embodiments of the figures, modifications may be employed in other embodiments. For example, for other vehicle components the display control information may be determined.

Although the present invention has been illustrated and described with respect to several preferred embodiments thereof, various changes, omissions and additions to the form and detail thereof, may be made therein, without departing from the spirit and scope of the invention.

What is claimed is:

1. A method performed in a processor of controlling an optical output device for displaying a vehicle surround view containing a vehicle model, the vehicle model comprising at least one vehicle component, the method comprising:
   receiving status information on the at least one vehicle component indicating a current operational state of the at least one vehicle component;
   determining display control information for the at least one vehicle component, wherein the display control information is determined based on at least the received status information;
   establishing a virtual camera position of the vehicle surround view;
   calculating a graphical representation of the at least one vehicle component based on the virtual camera position and the display control information, wherein, depending on the current operational state of the at least one vehicle component indicated by the display control information, at least one part of the graphical representation of the at least one vehicle component is selectively visible in the vehicle surround view; and
   controlling the optical output device to display the vehicle surround view such that the vehicle model depicts the at least one vehicle component according to the display control information.

2. The method according to claim 1, wherein the status information comprises at least one of the following: wheel rotational speed, steering wheel angle, vehicle velocity, operational state of lights, windowpane position, sunroof position.

3. The method according to claim 1, wherein the step of determining the display control information is reiterated over time when a change in status information is detected.

4. The method according to claim 1, wherein the display control information is determined based on at least user configuration data obtained from a user input.

5. The method according to claim 4, wherein the user configuration data is stored in a database.

6. The method according to claim 1, wherein displaying the vehicle surround view comprises dynamic animation of the at least one vehicle component.

7. The method according to claim 1, wherein the at least one vehicle component is selected from a group comprising: wheel, steering wheel, windowpane, front lights, rear lights, sunroof, vehicle body lacquering, turn indicator, or vehicle occupants.

8. A vehicle surround view system comprising:
   a processor for controlling an optical output device for displaying a vehicle surround view containing a vehicle model, the vehicle model comprising at least one vehicle component, wherein the processor is configured
   to receive status information on the at least one vehicle component indicating a current operational state of the at least one vehicle component;
   to determine display control information for the at least one vehicle component based on at least the received status information;
   to establish a virtual camera position of the vehicle surround view;
   to calculate a graphical representation of the at least one vehicle component based on the virtual camera position and the display control information, wherein, depending on the current operational state of the at least one vehicle component indicated by the display control information, at least one part of the graphical representation of the at least one vehicle component is selectively visible in the vehicle surround view; and
   to control the optical output device to display the vehicle surround view such that the vehicle model depicts the at least one vehicle component according to the display control information.

* * * * *